United States Patent [19]

Park et al.

[11] Patent Number: 5,554,434
[45] Date of Patent: Sep. 10, 1996

[54] MICRO LIGHT VALVE AND METHOD FOR MANUFACTURING THE SAME

[75] Inventors: Gyeong-Lyong Park; Sin-Chong Park; Hyung-Moo Park, all of Daejeon, Rep. of Korea

[73] Assignee: Electronics & Telecommunications Research Inst., Daejeon, Rep. of Korea

[21] Appl. No.: 224,295

[22] Filed: Apr. 7, 1994

Related U.S. Application Data

[62] Division of Ser. No. 149,653, Nov. 9, 1993, Pat. No. 5,393,710.

[30] Foreign Application Priority Data

Nov. 10, 1992 [KR] Rep. of Korea .................... 92-20984

[51] Int. Cl.$^6$ ..................................................... B32B 9/00
[52] U.S. Cl. .................................. 428/209; 310/40 MM; 428/210; 428/901
[58] Field of Search ............................ 310/309, 40 MM; 318/116; 428/209, 210, 901; 136/255

[56] References Cited

U.S. PATENT DOCUMENTS 4,070,206 1/1978 Kressel ..................................... 136/255
4,754,185 6/1988 Gabriel ..................................... 310/309

*Primary Examiner*—Patrick Ryan
*Assistant Examiner*—Patrick Jewik
*Attorney, Agent, or Firm*—Larson and Taylor

[57] ABSTRACT

A micro light valve which is corresponding to each of pixels for display and which passes or shuts a light beam by electrostatic force to display images, said light valve comprising a data electrode formed on a substrate and connected with each of data lines through a via; a selection electrode formed on the substrate and connected with each of selection lines; a common electrode formed between the selection and data electrodes; a flat-shaped micro shifting element capable of moving in linear direction and which serves as a resistance body; insulating layers formed respectively between the shifting element and each of the electrodes; a frame for serving as a black matrix, which has a guiding means for guiding the shifting element; and the three electrodes for receiving externally applied driving signals to drive the shifting element and which serve as stationary elements with three phases.

10 Claims, 9 Drawing Sheets

MICRO LIGHT VALVE AND METHOD FOR MANUFACTURING THE SAME

This is a division of application Ser. No. 08/149,653 filed Nov. 9, 1993, now U.S. Pat. No. 5,393,710.

BACKGROUND OF THE INVENTION

1. Field of the Invention

The present invention relates to a micro light valve for a flat display device, and more particularly to a micro light valve which is corresponding to each of pixel for display and can be controlled by use of electrostatic force to pass or shut a light beam, thereby displaying stationary and moving images, and a method for manufacturing the same.

2. Description of the Prior Art

In various types of light valves for passing or shutting a light beam, there is a liquid crystal display (referred to as "LCD", hereinafter) device using a liquid crystal, as typical light valve. Since such an LCD device is low in power consumption required for passing or shutting of a light beam through liquid crystal therein and is capable of driving a plurality of image pixels independently, the LCD device has been widely used in the display field.

The LCD device, as is widely used as a flat display device, can be operated by low voltage and fabricated with thin film, as compared with a conventional CRT (cathode ray tube) display. Particularly, a thin film transistor LCD device is one of the widely-used micro light valves, because it is capable of embodying a high image quality with respect to various colors.

However, in the case that such an LCD device is fabricated by the up-to-date techniques, several problems occur are as follows:

1. It is difficult to design pixel arrangement for display or to manufacture pixels in proportion to increase of the pixels.

2. As is the case with TFT (Thin Film Transistor) liquid crystal display device having a large panel, it is difficult to manufacture such a display device having a large panel. As a result, the larger the display panel is, the lower yield of the display device is.

3. Since the conventional display device, such as an LCD device, uses liquid crystal material as an intermediation for shutting and passing a light beam, it is difficult to utilize several complicated-processes, such as injection of liquid crystal materials, adjustment of space between two opposite substrates having a liquid crystal layer therebetween, orientation film forming process for arrangement of liquid crystal, or the like. Also, for this reason, cost of the display is very expensive.

4. View angle of the LCD is lower than that of CRT.

5. Since a polarization plate has to be provided in such an LCD, large amount of light is lost.

On the other hand, in the case of mechanical light valves as are developed recently, there is more power consumption, and it is difficult to manufacture such a micro light valve or to make its operation fast. However, with the progress of semiconductor fabrication techniques, micro actuators capable of operating mechanically can be manufactured. Accordingly, if size of such a mechanical light valve can be manufactured extremely small by the semiconductor fabrication techniques, the mechanical light valve permits to pass and to shut off a light beam fast by using little energy.

One pixel of the LCD device is approximately 100 μm×100 μm in size, but in the case that each pixel has less than the size, the further small pixel may be sensitively operated by electrostatic force caused by low voltage, as compared to gravity acting upon a body in motion. Therefore, if problems due to a frictional force between two faced bodied in motion can be overcame therein, each pixel having size of less than 100 μm×100 μm can be sensitively operated by high electrostatic force fast. This operation has been experimented several times in an electrostatic motor having micron meters of several tens in size.

In paper entitled as "Electrostatic Actuator with Resistive Slider", which is proposed by T. Higuchi and S. Egawa, of 1989 National Convention Record I.E.E., published in Japan, pp 191–192, an electrostatic linear actuator with a movable slider as a resistive body has been applied to move a sheet. This electrostatic actuator has advantages that an electrode is not necessary for a movable slider, and a repelling force as well as a driving force is produced between the slider and a layer, so that a frictional force can be largely reduced. However, such a electrostatic actuator can be manufactured by semiconductor fabrication techniques as well-known in the art. Also, since in the actuator pitch between electrodes is more large and thickness of insulating layer therebetween is very thick, a driving signal of several hundred voltages is necessary for driving of the actuator and it is impossible of driving the actuator fast.

SUMMARY OF THE INVENTION

It is an object of the present invention to provide a micro light valve, which can be manufactured by semiconductor fabrication techniques and operated at high speed, and in which a moving image or a stationary image can be displayed using a plurality of light valves, so as to overcome the above mentioned problems caused by LCD device.

It is an object of the present invention to provide a micro light valve, which can be driven at high speed by electrostatic force, and in which a moving image or a stationary image can be displayed using a plurality of light valves, so as to overcome the above mentioned problems caused by LCD device.

To achieve the objects of the present invention, the micro light valve for a flat display device according to one aspect of the present invention, comprises a flat-shaped micro shifting element capable of moving in linear direction and which serves as a resistance body, three electrodes for receiving driving signals to drive the shifting element and which serve as stationary elements with three phases, and insulating layers formed between the shifting element and each of the electrodes, a frame for serving as a black matrix, which has a guiding means for guiding the shifting element.

According to another aspect of the present invention, the micro light valve comprises a data electrode formed on a substrate and connected with each of data lines through a via; a selection electrode formed on the substrate and connected with each of selection lines; a common electrode formed between the selection and data electrodes; a flat-shaped micro shifting element capable of moving in linear direction and which serves as a resistance body; insulating layers formed respectively between the shifting element and each of the electrodes; a frame for serving as a black matrix, which has a guiding means for guiding the shifting element; and the three electrodes for receiving externally applied driving signals to drive the shifting element and which serve as stationary elements with three phases.

A method for manufacturing the micro light valve comprises the steps of preparing a semiconductor substrate with a main surface; forming a transparent electrode to be used as a data electrode, a selection electrode, and a common electrode on the main surface of said substrate in parallel; depositing an insulating layer on said substrate formed thus; forming a first sacrificial layer on said insulating layer; forming a patterned shifting element layer on said first sacrificial layer; forming a second sacrificial layer on said substrate which is provided with said shifting element layer, and removing a portion of said laminated sacrificial layers by etching to form a frame contact portion; forming a patterned frame layer on the frame contact portion and a portion of said second sacrificial layer; and removing said remaining sacrificial layers to form a frame and a shifting element capable of moving in said frame by electrostatic force applied externally.

In the method, said substrate is made of glass, said transparent electrode is made of an ITO film, and each of said selection and common electrodes is made of chromium.

Also, the step for forming said electrodes comprises the steps of forming said transparent layer on said substrate; and forming a patterned chromium layer on said substrate to form the selection and common electrodes in parallel.

Further, the step for forming said insulating layer is performed by depositing of nitride silicon twice, and each of said sacrificial layers is made of aluminum.

In addition, said shifting element layer is formed of a nitride silicon layer and an amorphous silicon layer which are laminated with a predetermined pattern. Said frame layer is formed of a nitride silicon layer and an amorphous silicon layer which are laminated with a predetermined pattern.

In another aspect the method for manufacturing the micro light valve comprises the steps of preparing a semiconductor substrate with a main surface; forming a transparent a data electrodes to be used as a data electrode, a selection electrode, and a common electrode on said substrate in parallel; depositing a first insulating layer on said substrate formed thus, and forming a via hole only on said transparent layer; forming a chromium layer on said first insulating layer and said via hole, and depositing a second insulating layer on said chromium layer; forming a first sacrificial layer on said second insulating layer; forming a patterned shifting element layer on said first sacrificial layer; forming a second sacrificial layer on said substrate which is provided with said shifting element layer, and removing a portion of said laminated sacrificial layers by etching to form a frame contact portion; forming a patterned frame layer on the frame contact portion and a portion of said second sacrificial layer; and removing said remaining sacrificial layers to form a frame and a shifting element capable of moving in said frame by electrostatic force applied externally.

Those micro light valves formed thus can be arranged in two-dimensional construction, and also driven by a driving method similar to that of the convention LCD device, to thereby embody a flat display device having a plurality of micro pixels.

The surface micro-machining technique to be used in the present invention means that structural layers and sacrificial layers are deposited on a substrate and the laminated layers are patterned and removed by etching methods to form a complicated micro-structure. Here, the sacrificial layers are ones which are finally removed so as to independently isolate a body in motion from the other laminated layers.

BRIEF DESCRIPTION OF THE DRAWINGS

This invention may be better understood and its objects and advantages will become apparent to those skilled in the art by reference to the accompanying drawings as follows.

DESCRIPTION OF THE PREFERRED EMBODIMENT(S)

An embodiment according to the present invention will be described hereinafter with reference to FIGS. 1A to 1H.

Figure 1A:
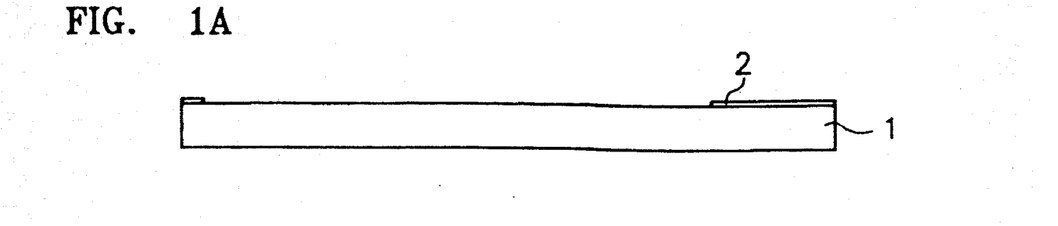
FIGS. 1A to 1H are cross-sectional views showing the steps for manufacturing a micro light valve to be used in a flat display device in accordance with an embodiment of the present invention.

Referring to FIG. 1A, an ITO (indium tin oxide) layer having 2000 Å in thickness is formed on a glass substrate 1 by sputtering at a high temperature, and then on the ITO layer is deposited a photoresist (not shown). Next, the Photoresist is patterned by a photolithography, as well-known in the semiconductor fabricating techniques, so as to define a transparent electrode as a data electrode 2. Also, a part of the ITO layer is removed by a wet-etching method or a dry etching method, as well-known in the art, using the patterned photoresist as a data electrode forming mask, to thereby form the data electrode 2 having 30 μm in width, as shown in FIG. 1A.

Figure 1B:
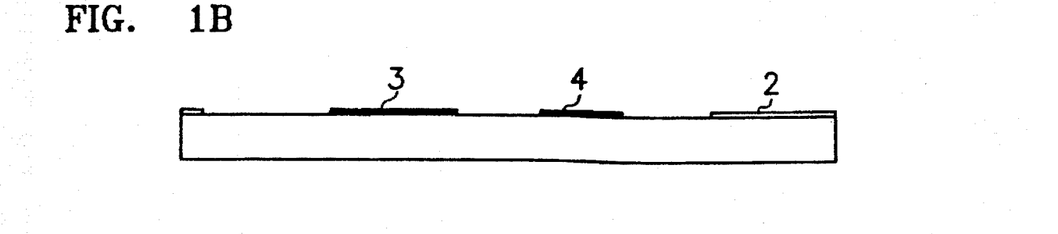

In FIG. 1B, on the substrate 1 is formed a chromium layer having the same as the thickness of the ITO layer by an electron beam deposition method. Subsequently, a patterned photoresist is formed on the chromium layer and then parts of the chromium layer are removed by etching to thereby form a selection electrode 3 having 30 μm in width and a common electrode 4 having 20 μm in width. Also, the electrodes on the substrate 1 are spaced with 20 μm in distance therebetween.

Figure 1C:
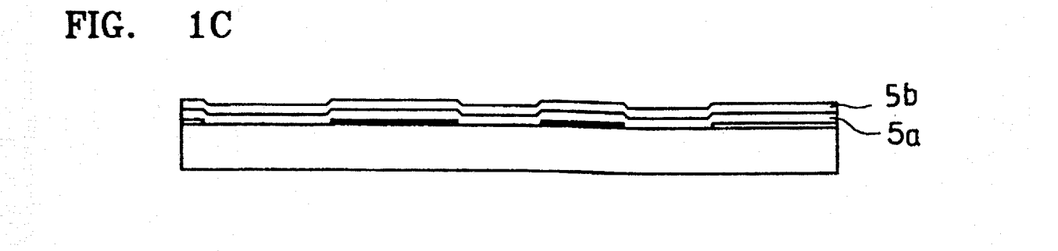

With respect to FIG. 1C, on the substrate formed thus is deposited a first insulating layer 5a having thickness of 5000 Å by using an LPCVD (low pressure chemical deposition) method. Then, on the first insulating layer 5a is depositing a second insulating layer 5b having thickness of 5000 Å by the LPCVD method. The first and second insulating layer 5a and 5b are made of nitride silicon, respectively.

Figure 1D:
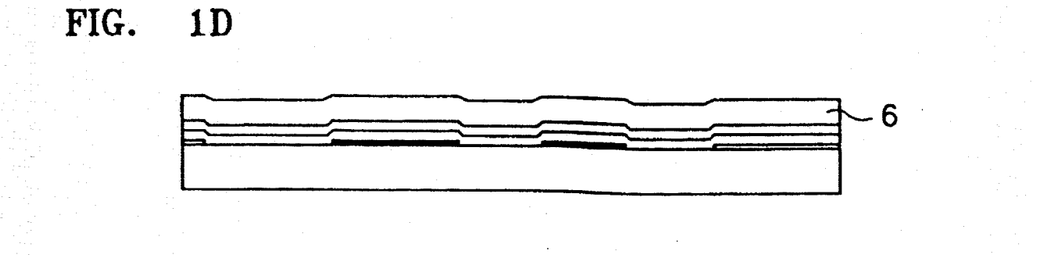

In FIG. 1D, by using the electron beam deposition method on the second insulating layer 5b is formed an aluminum layer having thickness of 3 μm to be used as first sacrificial layer 6 of a light valve, which is completely formed by the following steps.

Figure 1E:
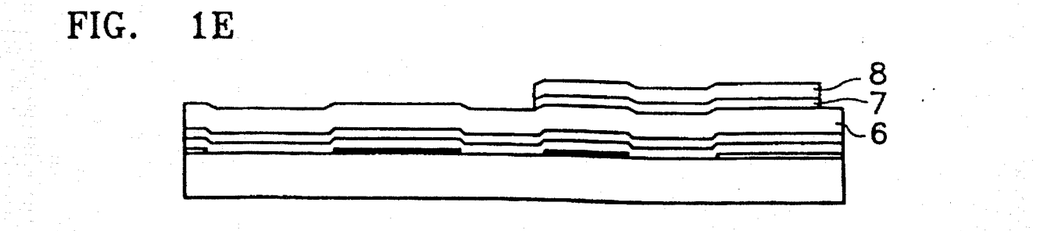

FIG. 1E shows the step for manufacturing a shifting element which serves as a resistance body or shutter of a light valve. As shown in FIG. 1E, on the first sacrificial layer 6 is deposited a nitride silicon layer 7 having 1 μm in thickness, and then on the nitride silicon layer 7 is deposited an amorphous silicon layer 8 having 2 μm in thickness. Subsequently, after forming of a patterned photoresist layer (not shown) on the amorphous silicon layer 8, the laminated nitride and amorphous silicon layers 7 and 8 are selectively removed in order by an RIE (reactive ion etching) method, using the patterned photoresist as a mask, and therefore a shifting element in a light valve is Produced. In this embodiment, the amorphous silicon layer 8 is formed having a plate resistance of $10^9$–$10^{10}$Ω/□, preferably.

Generally, an amorphous silicon can be deposited at low temperature. Also, it can shut a light beam by thickness of 2 μm only, because it has a sufficient absorbance with respect to a visible ray.

Figure 1F:
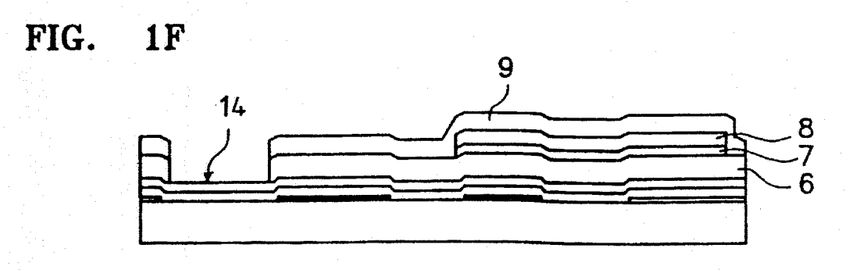

In FIG. 1F, an aluminum layer is deposited on the first sacrificial layer 6 and the shifting element by the electron beam deposition method to form a second sacrificial layer 9 having thickness of 2 μm. Next, on the second sacrificial layer 9 formed thus is deposited a patterned photoresist layer to thereby define a frame of the light valve. With the Patterned photoresist layer as a mask, the sacrificial layers 6 and 9 are removed using pure $H_3PO_4$ solution at 60° C. to form a frame contact hole 14.

Figure 1G:
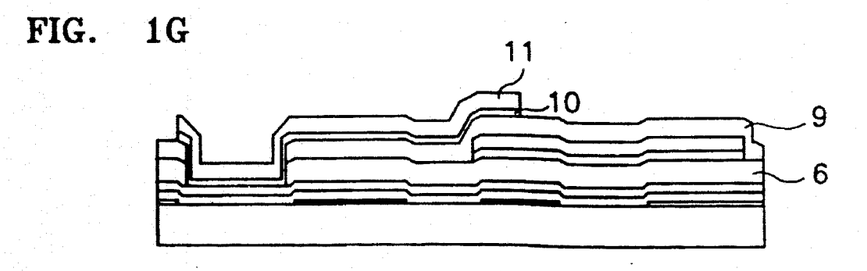

FIG. 1G shows a step for manufacturing a frame with a moving guider in which the shifting element is capable of moving therein. With respect to FIG. 1G, a nitride silicon layer 10 is filled in the frame contact hole 14 and deposited on the second sacrificial layer 9 by the LPCVD method. Also, on the nitride silicon layer 10 is deposited an amorphous silicon layer 11 having 3 μm in thickness. Subsequently, after formation of a patterned photoresist layer (not shown) on the amorphous layer 11, the laminated nitride and amorphous silicon layers 10 and 11 are removed in order by the RIE method, using the patterned photoresist layer (not shown) as a frame forming mask. The frame formed thus functions as a moving guider for the shifting element, and also serves as the black matrix similar to that of a Well-known liquid crystal display device.

Figure 1H:
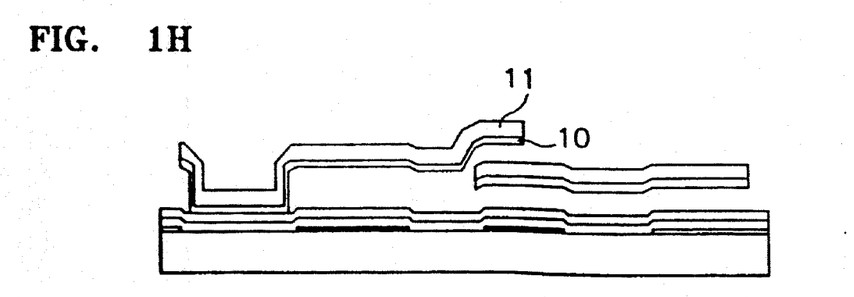

In addition, the first and second sacrificial layers 6 and 9 are simultaneously removed, as shown in FIG. 1H, so that the shifting element can be moved in the moving guider of the frame. Then, the etching solution for removing all the sacrificial layers 6 and 9 may use $H_3PO_4$ solution at 60° C.

Operating principle of the micro light valve will be described hereinafter with reference to the attached drawings.

Figure 2A:
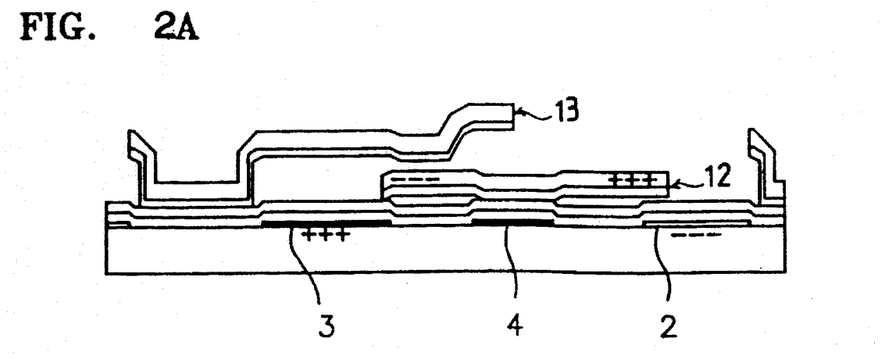
FIGS. 2A to 2C are schematic diagrams showing positions of a shifting element in the light valve, as shown in FIG. 1H, based on changes of polarity in each of electrodes.

As shown in FIG. 2A, if a voltage signal having positive polarity is applied both of the selection electrode 3 with respect to voltage of the common electrode 4, and a voltage signal having negative polarity is applied to the data electrode 2, the shifting element 12 where is under a predetermined position of the frame 13 is charged electrically at the opposite ends thereof, because the shifting element 12 serves as a resistance body in which electrical polarity can be charged therein. When the charged condition is reached to a state of equilibrium over a predetermined time, the positive polarity of the selection electrode 3 can be changed instantaneously to negative polarity in accordance with change of the voltage signal to be applied sequentially to the selection lines 17-1 to 17-n.

Figure 2B:
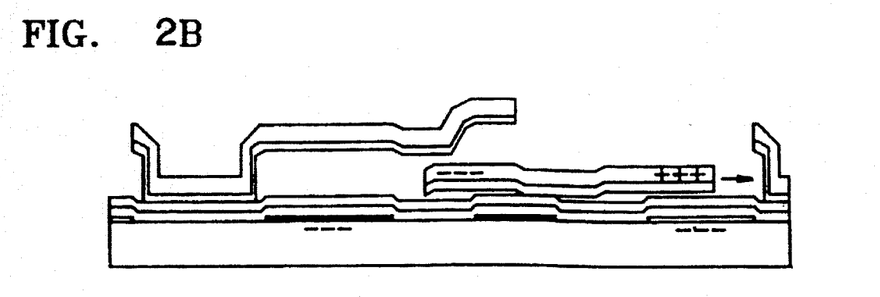
Figure 2C:
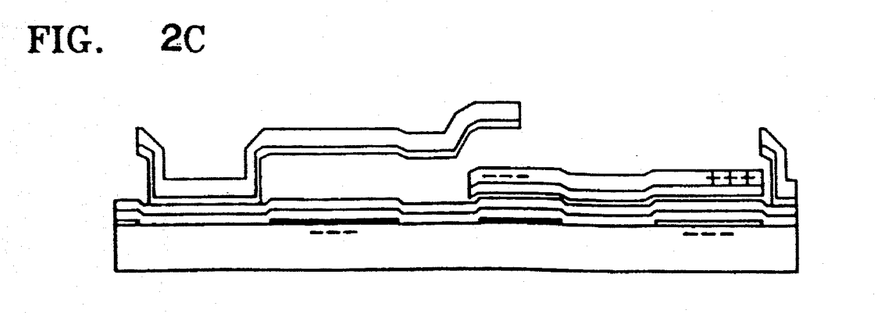

However, the shifting element 12 tends to be moved to right direction as shown in FIG. 2B, because the charges charged electrically in the shifting element 12 can be not moved in a moment therein due to interruption of charge flow by the internal resistance thereof. In this state, a repelling force is produced between left portion of the shifting element 12 and the selection electrode 3 all having negative polarity, and a driving force is produced due to the repelling force so as to move the shifting element 12 to right direction, the arrow direction as shown in FIG. 2B. As a result, the shifting element 12 can be moved to the right direction to change the light valve from the open state to the close state, as shown in FIG. 2C.

In the construction of this light valve, the time required for changing polarity of the shifting element 12 from positive polarity to negative polarity or negative polarity to positive polarity may be given by the following equation:

$$T=RC/2$$

where, R is a resistance of the shifting element and C is a capacitance of the capacitor formed by the shifting element and each of the electrodes. In the state of the light valve as shown in FIG. 2C, the capacitance is approximately $2\times10^{-14}$ F, and, when R=$10^9$Ω, τ is about 10 μm sec.

Figure 3:
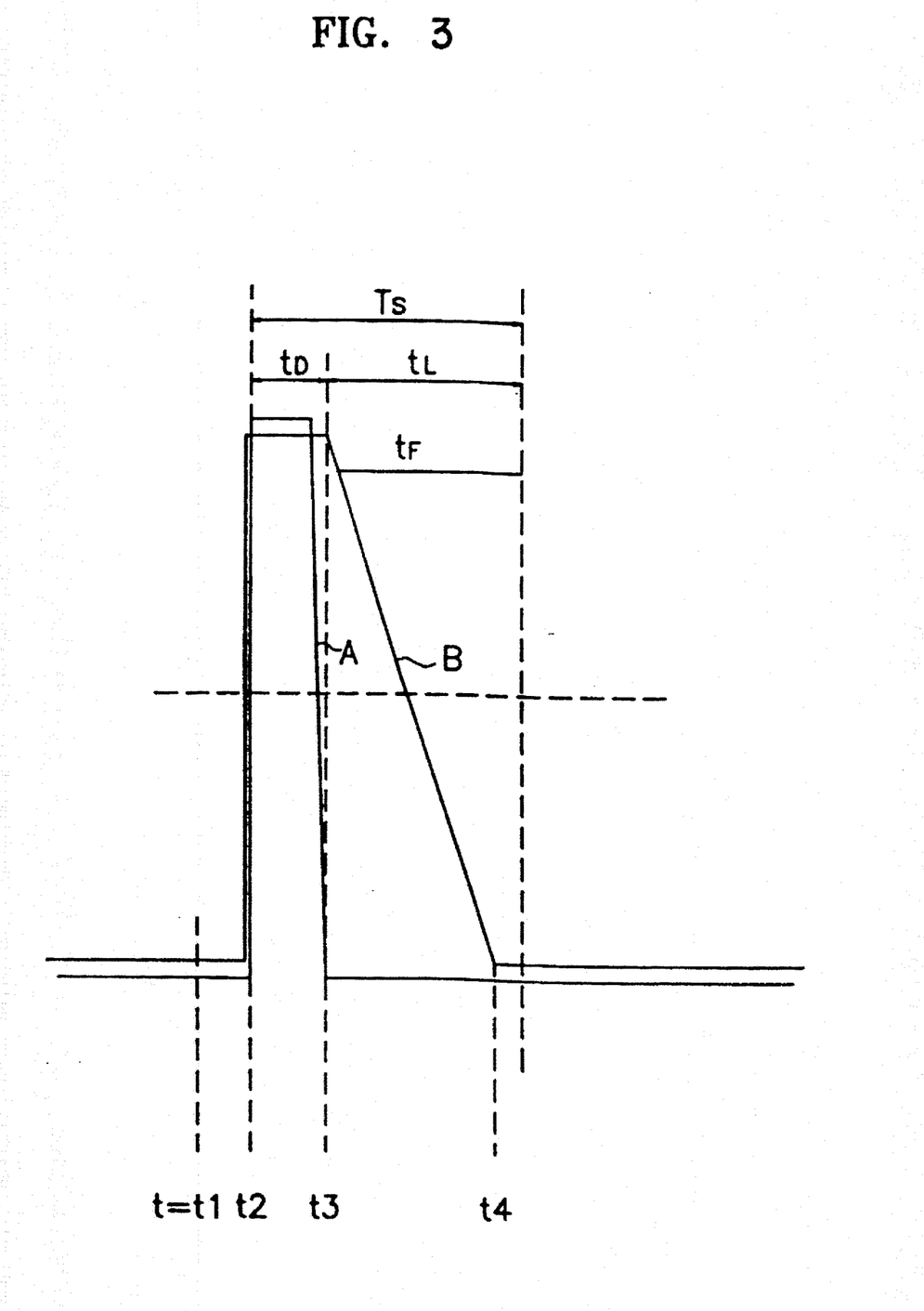
FIG. 3 is a waveform diagram of driving signals for changing position of the shifting element in the light valve, as shown in FIG. 1H.

In order to move the light valve from the close state to the open state, or from the open state to the close state, voltage signal having positive polarity has to be simultaneously applied to both of the selection electrode 3 and the data electrode 2, as shown in FIG. 3.

On the other hand, when the selection electrode 3 is at a positive signal, for example an ON signal, and a data signal to be applied the data electrode 2 maintains a negative voltage, or when the selection electrode 3 is at a negative signal, for example an OFF signal, without reference to level of the data signal, previous state of the light valve is maintained always. In detail, when both the selection and data electrodes 3 and 2 do not maintain an ON signal, the light valve is always to maintain the previous state.

In order to drive the light valve accurately, the following conditions are satisfied as follows:

1) Rising time of the driving signal has to be shorten sufficiently, and the time both of the data and selection electrodes are maintained at an ON signal has to be not longer than the charge relaxation time in the shifting element. That is, in FIGS. 5 and 6 $t_D$ has to satisfy condition of $t_D<\tau$.

Figure 5A:
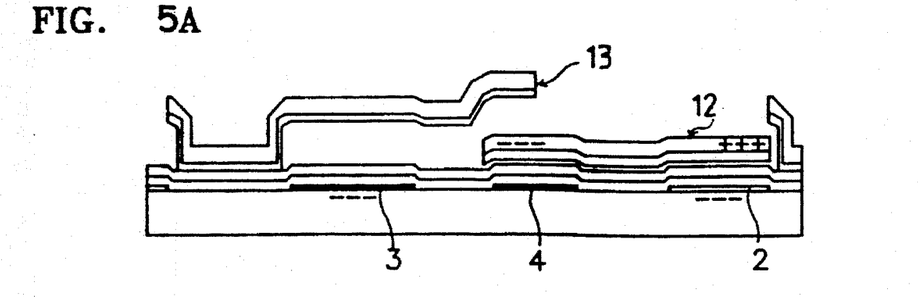
FIGS. 5A to 5D are schematic diagrams showing changes in position of the shifting element from a close state to an open state in accordance with timing of the driving signals, as shown in FIG. 3.

2) During one period of a data signal to be applied to the data electrode, the time the data signal is maintained at an OFF state has to be longer than the charge relaxation time. That is, in FIGS. 5 and 6 $t_L$ has to satisfy condition of $t_L>\tau$ in order to obtain stability of an initial condition, as shown in FIG. 5A.

3) Descending time of the signal to be applied to the selection line has to be nearly similar to the charge relaxation time. That is, $t_F$ has to satisfy condition of $t_F \geq \tau$.

Hereinafter, a driving method and driving states of the light valve based on driving signals will be described with reference to FIGS. 5 to 6.

FIGS. 5A to 5D show changes in position of the shifting element from a close state to an open state in accordance with timing of the driving signals, as shown in FIG. 3.

In FIG. 5A, it is shown that a shifting element 12 is further apart from a frame 13, that is, a close state or an initial state, when $t=t_1$ in FIG. 3.

Figure 5B:
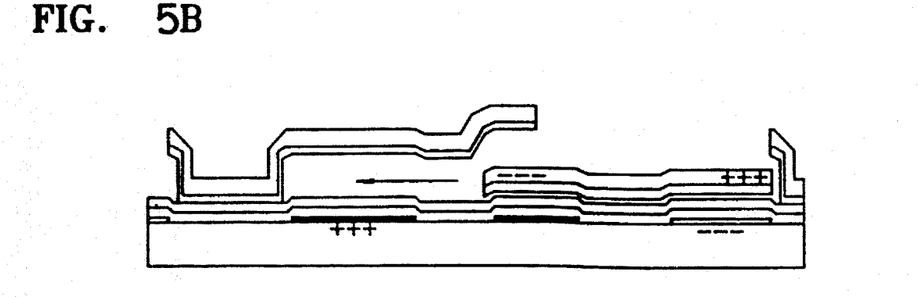

FIG. 5B shows that the shifting element 12 tends to be moved to the frame 13, when $t=t_2$ in. FIG. 3. With respect to FIG. 5B, it is illustrated that polarity of the voltage to be applied to the data electrode 2 is changed instantaneously, but charge of the shifting element 12 which is charged by the data electrode 2 can not act on instantaneously. Accordingly, the shifting element 12 is positioned as shown in FIG. 5B. In this state, since the charges charged electrically in the shifting element 12 can be not moved in a moment due to interruption of charge flow by the internal resistance of the element 12, a repelling force is produced between the shifting element 12 and the data electrode 2, and a driving force is produced to move the shifting element 12 to left direction, the arrow direction as shown in FIG. 5B. Accordingly, the shifting element 12 is moved to the left direction so that the light valve can be driven from the close state to the open state.

Also, in this state a frictional force between the shifting element in motion and the second insulating layer 5b can be largely reduced by the repelling force therebetween. Shifting of the shifting element in the light valve has to be performed completely within the relaxation time of charges. Then, degree of the acceleration of the shifting element 12 caused by the electrostatic force is 1000 times more fast than the acceleration of gravity.

Figure 5C:
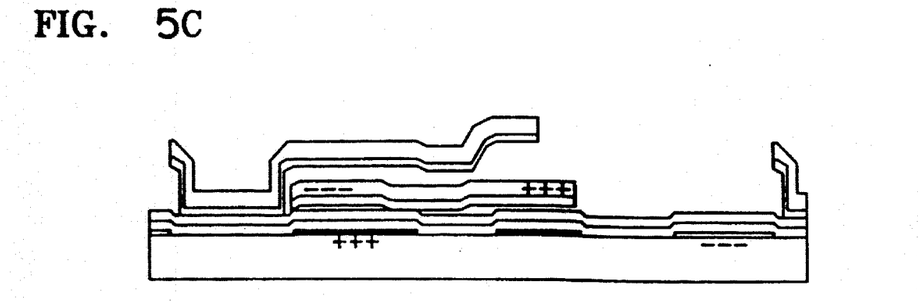

FIG. 5C shows that the shifting element 12 is inserted in the frame 13, when $t=t_3$ in FIG. 3. In this time, the data signal is changed to an OFF state again, but the shifting element 12 is completely inserted in the frame 13 due to attraction between the selection electrode charged to a negative polarity and the shifting element charged to a positive polarity.

Figure 5D:
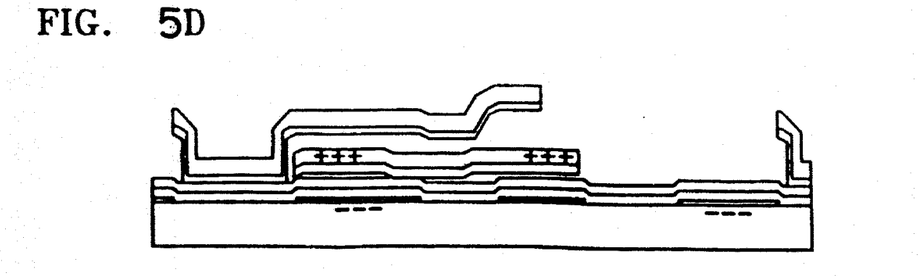

In FIG. 5D, the shifting element 12 is not moved and then redistribution of charges therein is performed, as a result state of equilibrium can be obtained from the charged state of the shifting element.

FIGS. 6A to 6D show changes in position of the shifting element from an open state to a close state in accordance with timing of the driving signals, as shown in FIG. 3.

Figure 6A:
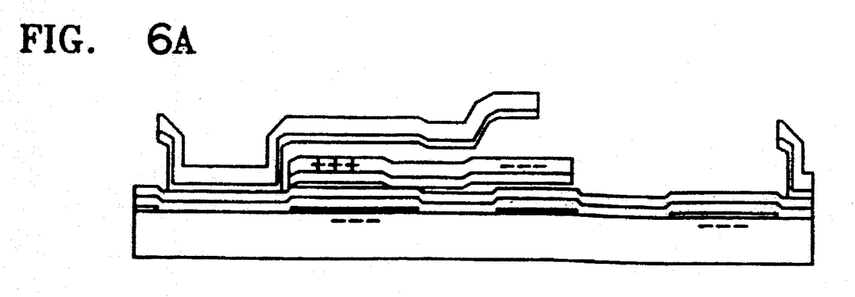
FIGS. 6A to 6D are schematic diagrams showing changes in position of the shifting element from an open state to a close state in accordance with timing of the driving signals, as shown in FIG. 3.

In FIG. 6A, it is shown that a shifting element 12 is completely inserted in a frame 13, that is, an open state or an initial state, when $t=t_1$ in FIG. 3. At the time the period $T_S$ of a signal is started, condition of the light valve is established as one of the initial states, as shown in FIGS. 5A and 5A.

Figure 6B:
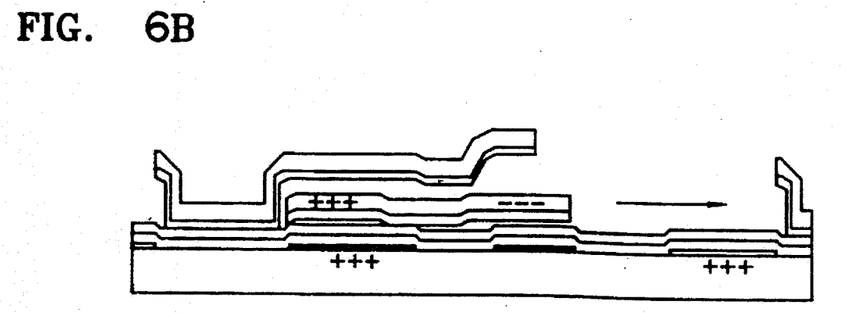

FIG. 6B shows that the shifting element 12 tends to be moved to the frame 13, when $t=t_2$ in FIG. 3. With respect to FIG. 6B, it is illustrated that the negative polarity of the voltage signal to be applied to each the data and selection electrodes 2 and 3 is changed instantaneously to positive polarity, but the shifting element 12 which is charged with the electrodes can not changed instantaneously. This is because the shifting element serves as a resistance body. Accordingly, the shifting element 12 begins to move to the right direction as shown in FIG. 6B. In this state, since the charges charged electrically in the shifting element 12 can be not distributed in a moment due to interruption of charge flow by the internal resistance of the element 12, a repelling force is produced between the left portion of the shifting element 12 and the selection electrode 3, and an attraction force is produced between the left portion of the shifting element and the data electrode 2 so that the shifting element 12 can be moved to left direction, the arrow direction as shown in FIG. 6B.

Also, in this state a frictional force between the shifting element and the second insulating layer 5b can be largely lowered by the repelling force therebetween. Shifting of the shifting element in the light valve has to be performed completely within the relaxation time of charges. Then, degree of the acceleration in the shifting element 12 caused by the electrostatic force is 1000 times more fast than the acceleration of gravity.

Figure 6C:
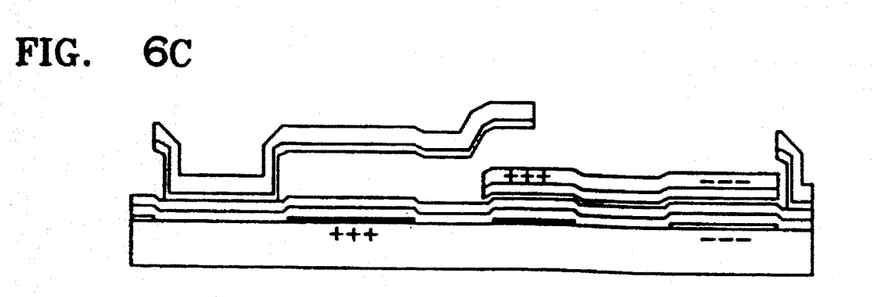

FIG. 6C shows that the shifting element 12 is completely moved from the frame 13 to the data electrode 2, when $t=t_3$ in FIG. 3. In this time, the data signal is changed to an OFF state again, but the shifting element 12 is completely shifted from the frame 13 due to the repelling force between the selection electrode charged to a positive polarity and the left portion of the shifting element charged to a positive polarity, so that the close state can be maintained in the light valve.

Figure 6D:
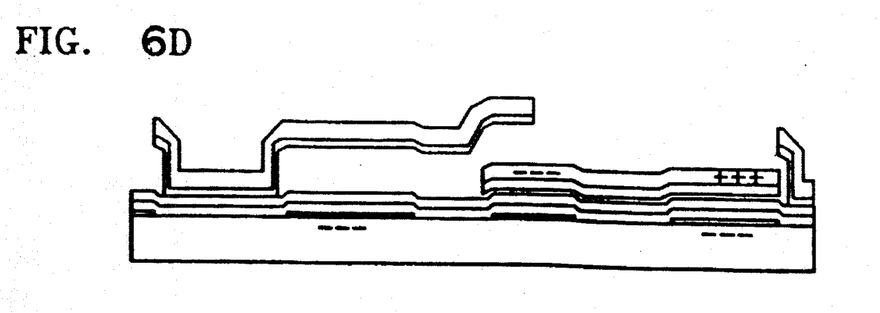

In FIG. 6D, the shifting element 12 is not moved and redistribution of charges therein is performed to change the charged state to the state of equilibrium between $t_3$ and $t_4$ in timing of the voltage signal to be applied to the selection electrode 4.

On the other hand, when the selection electrode 3 is at a positive signal, or an ON signal, and a data signal to be applied the data electrode 2 is an OFF state, or when the selection electrode 3 is at an OFF state without reference to level of the data signal, the previous state of the light valve has be maintained.

FIGS. 7A to 7G show the charged states of the light valve which is maintained at a close state as an initial state.

Figure 4:
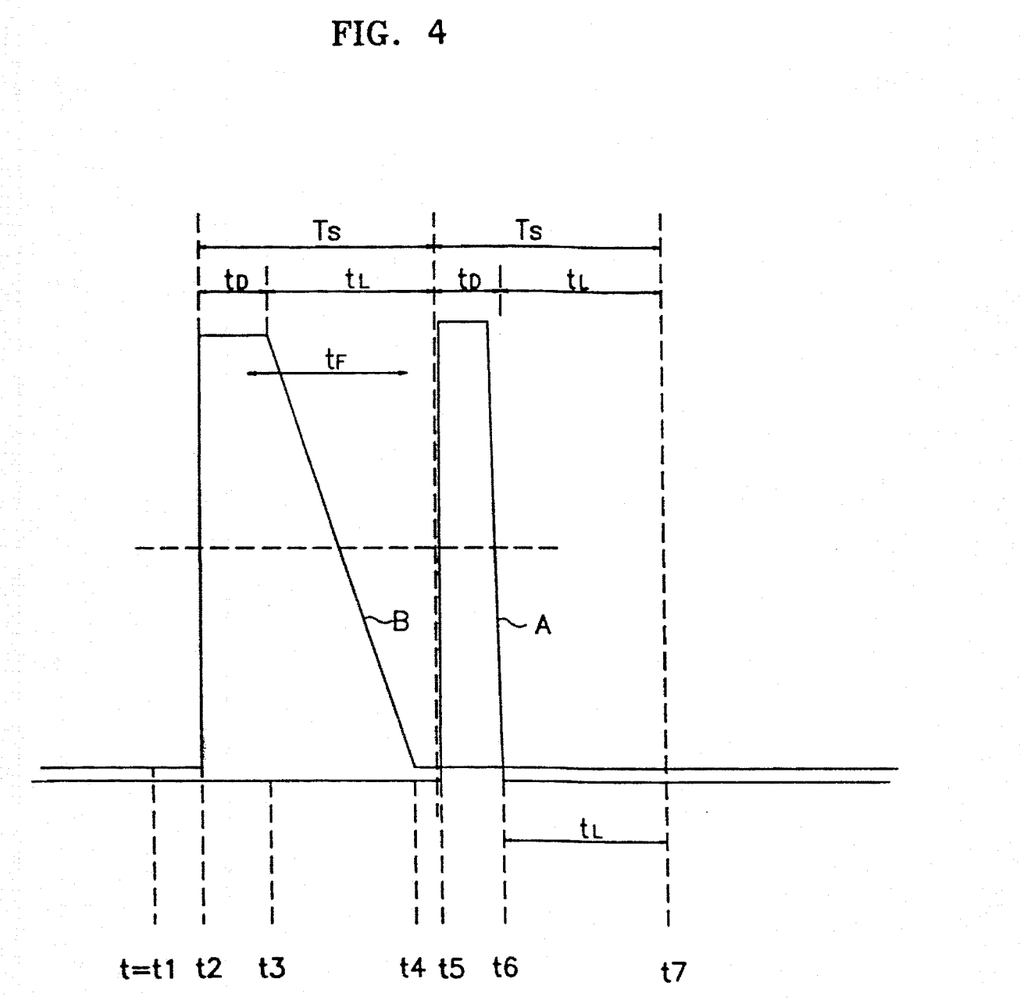
FIG. 4 is a waveform diagram of driving signals for holding previous state of the light valve.
Figure 7A:
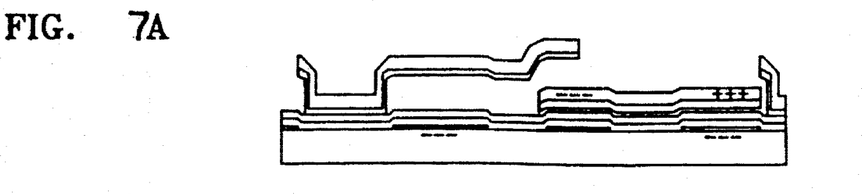
FIGS. 7A to 7G are schematic diagrams showing changes in position of the shifting element in accordance with timings of the driving signals, as shown in FIG. 4, in case of maintaining of the close state in the light valve.

In FIG. 7A, it is shown that a shifting element 12 is apart from a frame 13, that is, a close state or an initial state, when $t=t_1$ in FIG. 4. The condition of $t=t_1$ means that a negative voltage signal is applied to both of the selection and data electrodes, as shown in FIG. 4.

Figure 7B:
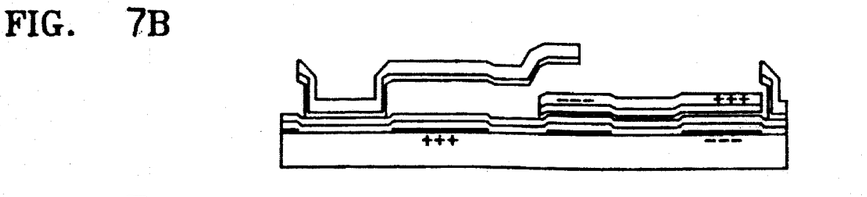

FIG. 7B shows the charged state of the light valve, when $t=t_2$ in FIG. 4. With respect to FIG. 7B, it is illustrated that the negative polarity of the selection electrode 3 is changed instantaneously to the negative polarity. Then, the selection electrode 3 is charged with the positive polarity, but the data electrode 2 is charged with the negative polarity, and thus the shifting element 12 is positioned at the close state, as shown in FIG. 7B.

Figure 7C:
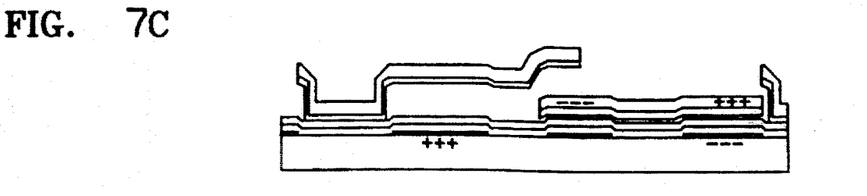
Figure 7D:
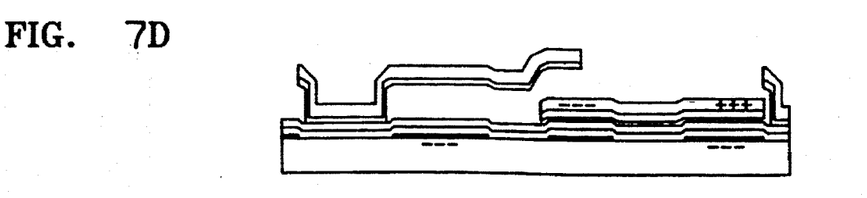

FIG. 7C shows that the previous state of the light valve is maintained continuously, when $t=t_3$ in FIG. 4. In FIG. 7D, it is shown that the positive polarity of the selection electrode 3 is changed again to the negative polarity, when $t=t_4$.

Figure 7E:
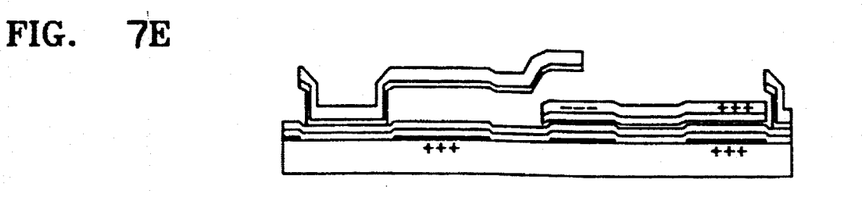

FIG. 7E shows that the polarity of the data electrode 2 is changed to the positive polarity, when $t=t_5$ in FIG. 4. Then, the data signal is an ON state, but the selection electrode 3 is maintained at an OFF state, so that the shifting element 12 can not be moved therein.

Figure 7F:
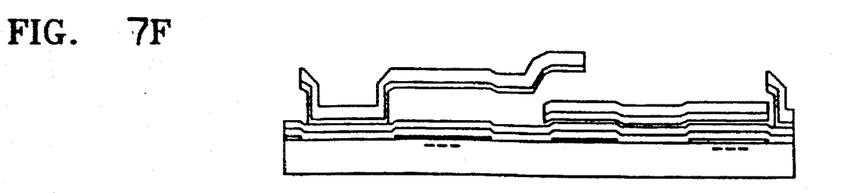

In FIG. 7F, it is illustrated that the polarity of the data electrode 2 is changed to the negative polarity, when $t=t_6$ in FIG. 4. Then, the charged state of the shifting element 12 is relaxed to the uniformly varying state, that is, the charges in the shifting element 12 tend to be distribute therein. Since the time $T_D$ the data signal is during an ON state is shorten, as compared to the charge relaxation time of the shifting element 12, and the data signal becomes an OFF state again without performing of sufficient distribution of the charges in the shifting element, the charged state of the light valve is set to the initial state, as in FIG. 7A.

Figure 7G:
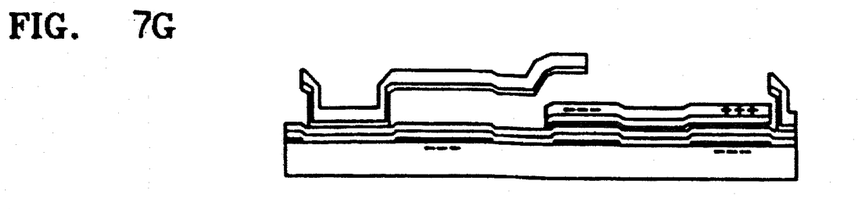

FIG. 7G shows that the charged state of the light valve is changed to the initial state as in FIG. 7A or FIG. 7D, when $t=t_7$ in FIG. 4. In this state, since $t_L$ is longer than $\tau$ during one period of the signal, the charges in the shifting element 12 can be relaxed sufficiently therein to form a state of equilibrium.

FIGS. 8A to 8G show the charged states of the light valve which is maintained at an open state as an initial state.

Figure 8A:
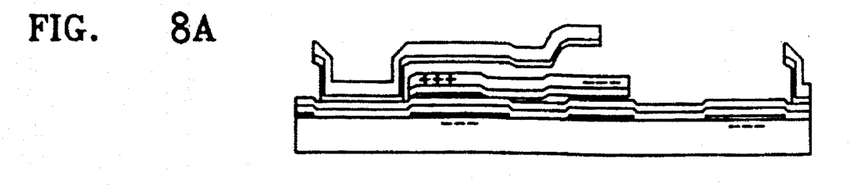
FIGS. 8A to 8G are schematic diagrams showing changes in position of the shifting element in accordance with timings of driving signals, as shown in FIG. 4, in case of maintaining of the open state in the light valve.

In FIG. 8A, it is shown that a shifting element 12 is inserted in a frame 13, that is, an open state or an initial state, when $t=t_1$ in FIG. 4. The condition of $t=t_1$ means when a negative voltage signal is applied to both of the selection and data electrodes 3 and 2, as shown in FIG. 4.

Figure 8B:
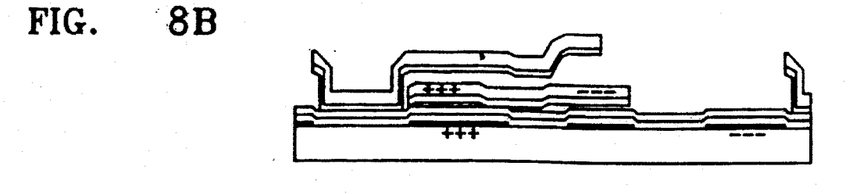

FIG. 8B shows the charged state of the light valve, when $t=t_2$ in FIG. 4. With respect to FIG. 8B, it is illustrated that the negative polarity charged previously in the selection electrode 3 is changed instantaneously to the positive polarity. Then, the selection electrode 3 is charged with the positive polarity, but the data electrode 2 is maintained at the negative polarity, and thus the shifting element 12 is positioned in the open state, as shown in FIG. 8B. In this state, the signal to be applied to the selection electrode is change instantaneously to ON state to produce a repelling force between the shifting element and the selection electrode, but a repelling force is also produced between the shifting element and the data electrode so that the shifting element can not be moved to the right direction thereof.

Figure 8C:
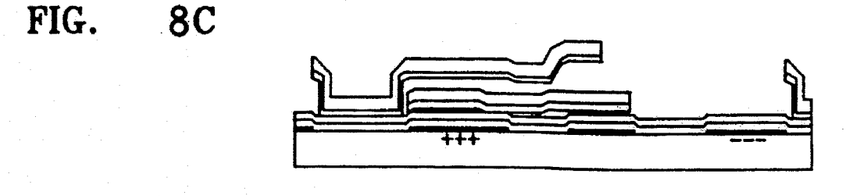

In FIG. 8C, it is shown that the electrodes 3 and 2 are maintained at previous state. Then, the charged state of the shifting element 12 is released to the uniformly varying state, that is, the charges in the shifting element 12 tend to be distributed during the time between $t_2$ and $t_3$ therein. Then, since time $t_D$ is more shorter than the charge relaxation time, charge distribution in the shifting element is not performed sufficiently.

Figure 8D:
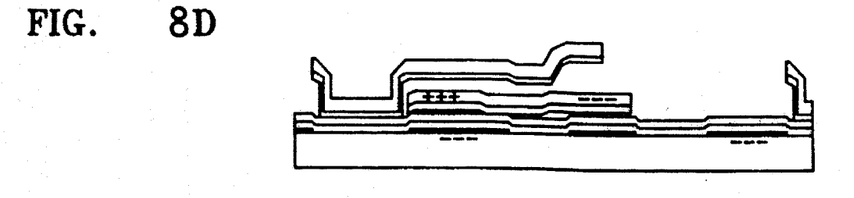

With respect of FIG. 8D, it is shown that the previous polarity of the selection electrode 3 is changed again to the negative polarity and the shifting element 12 is charged at both of the ends thereof, when $t=t_4$, as in the initial state of FIG. 8A.

Figure 8E:
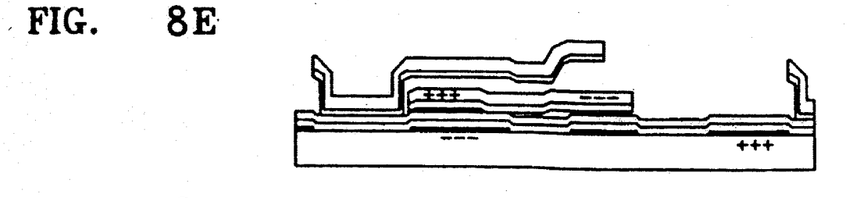

FIG. 8E shows that the negative polarity of the data electrode 2 is changed to the positive polarity, when $t=t_5$ in FIG. 4. Then, the data signal to be applied the data electrode 2 is an ON state, but the selection electrode 3 is maintained at an OFF state, so that the shifting element 12 can not be shifted from the frame to the right direction. In this state, any polarity change of the data signal is not effected in moving of the shifting element.

Figure 8F:
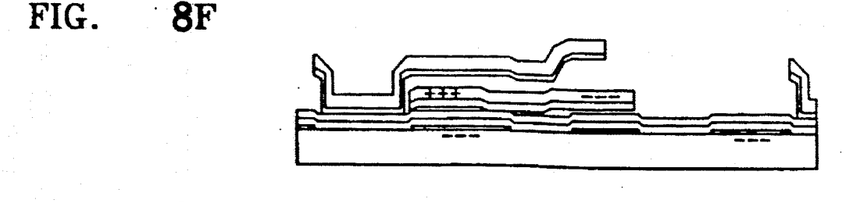

In FIG. 8F, it is illustrated that the positive polarity of the data electrode 2 is changed to the negative polarity, when $t=t_6$ in FIG. 4. As is the case with the state of FIG. 8E, also in this state, the shifting element is not effected to be maintained at the previous state.

Figure 8G:
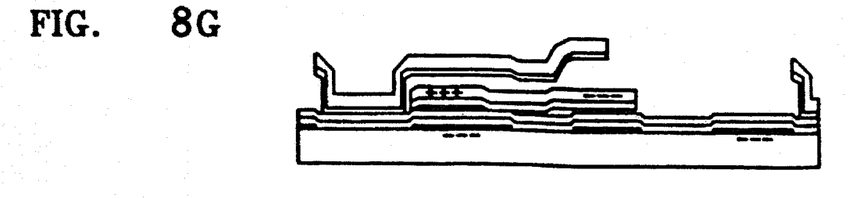

FIG. 8G shows that the charged state of the light valve is changed to the initial state as in FIG. 8A or FIG. 8D, when $t=t_7$ in FIG. 4.

As described above, the present invention is provided for a flat display device in which a shifting element, in the light valve as is manufactured by the surface micro-machining method, can be shifted by electrostatic force to pass or shut a light source.

Accordingly, the micro light valve of the present invention can be manufactured using the conventional semiconductor fabrication method only. Also, to manufacture the micro light valve, it is not necessary to utilize several complicated-processes, such as space arrangement between two substrates having a liquid crystal layer therebetween, orientation film forming process for arrangement of liquid crystal, or the like, as compared with several types of liquid crystal display devices as the conventional display devices, so that the flat display device having high pixel density can be manufactured easily.

Furthermore, the micro light valve of the present invention has a good display quality as well as a good light transmissivity, because the device is not embodied of liquid crystal as an intermediation material. In addition, with the driving method of the flay display device, moving image as well as stationary image can be displayed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A micro light valve which is used for a pixel of a display device and which passes or shuts off a light beam by utilizing an electrostatic force, said light valve comprising:

a substrate through which light can pass;

a plurality of data lines and selection lines;

a data electrode formed on said substrate and connected with at least one of said data lines;

a selection electrode formed on said substrate and connected with each of selection lines;

a common electrode formed on said substrate between the selection and data electrodes;

a flat-shaped micro shifting element capable of moving in a linear direction and which serves as a light shutter;

an insulating layer formed respectively between the shifting element and each of the electrodes;

a frame which has a guiding means for guiding the shifting element and said data, selection and common electrodes for receiving externally applied driving signals to drive the shifting element.

2. A micro light valve as claimed in claim 1 wherein said shifting element is a laminate having a high plate resistance.

3. A micro light valve as claimed in claim 2 wherein said shifting element is a laminate comprised of one layer of an amorphous silicon and one layer of a nitride silicon.

4. A micro light valve as claimed in claim 3 wherein said amorphous silicon layer is two microns in thickness and said nitride silicon layer is one micron in thickness.

5. A micro light valve as claimed in claim 2 wherein said frame is a laminate comprised of one layer of an amorphous silicon and one layer of a nitride silicon.

6. A micro light valve as claimed in claim 1 wherein said substrate is transparent.

7. A micro light valve as claimed in claim 6 wherein said substrate is made of glass.

8. A micro light valve as claimed in claim 7 wherein said data electrode is transparent.

9. A micro light valve as claimed in claim 8 wherein said data electrode is made of indium tin oxide.

10. A micro light valve as claimed in claim 6 wherein said data electrode is transparent and wherein said shifting element is moved by electrostatic forces generated by signals on said electrodes between a first, shut position over said data electrode whereby said data electrode is blocked from incident light, and a second, open position where said data electrode is not blocked from incident light.

* * * * *